No. 809,341. PATENTED JAN. 9, 1906.
B. VIOLA.
VEHICLE BRAKE.
APPLICATION FILED MAR. 20, 1905.
2 SHEETS—SHEET 2.
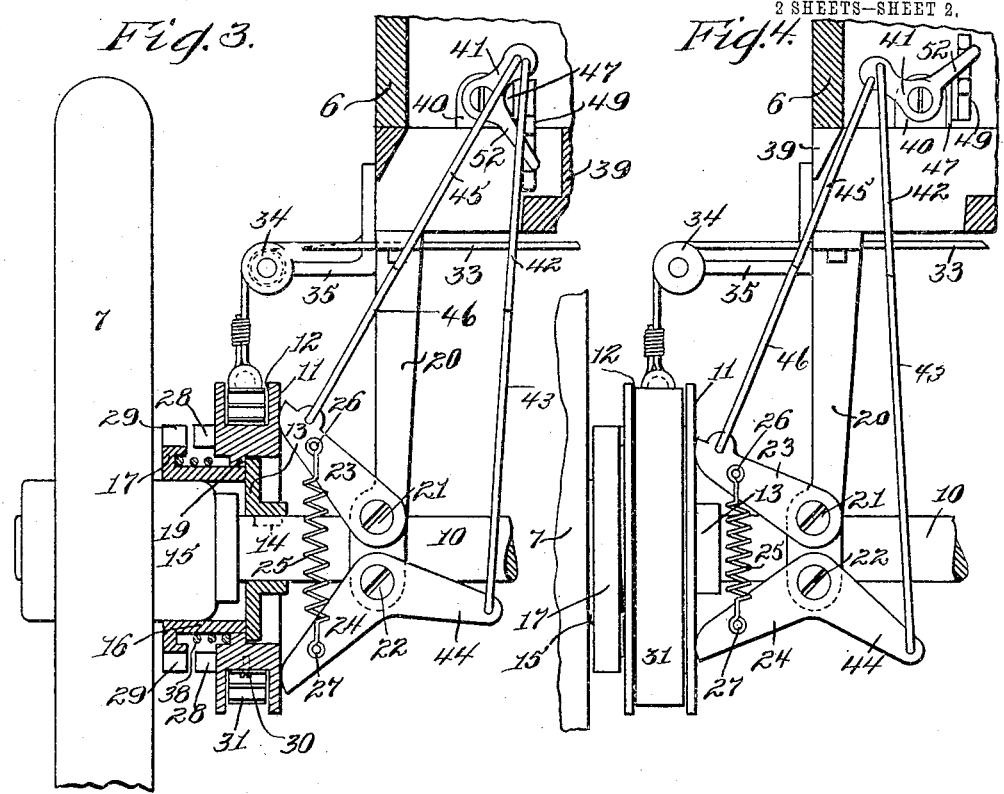
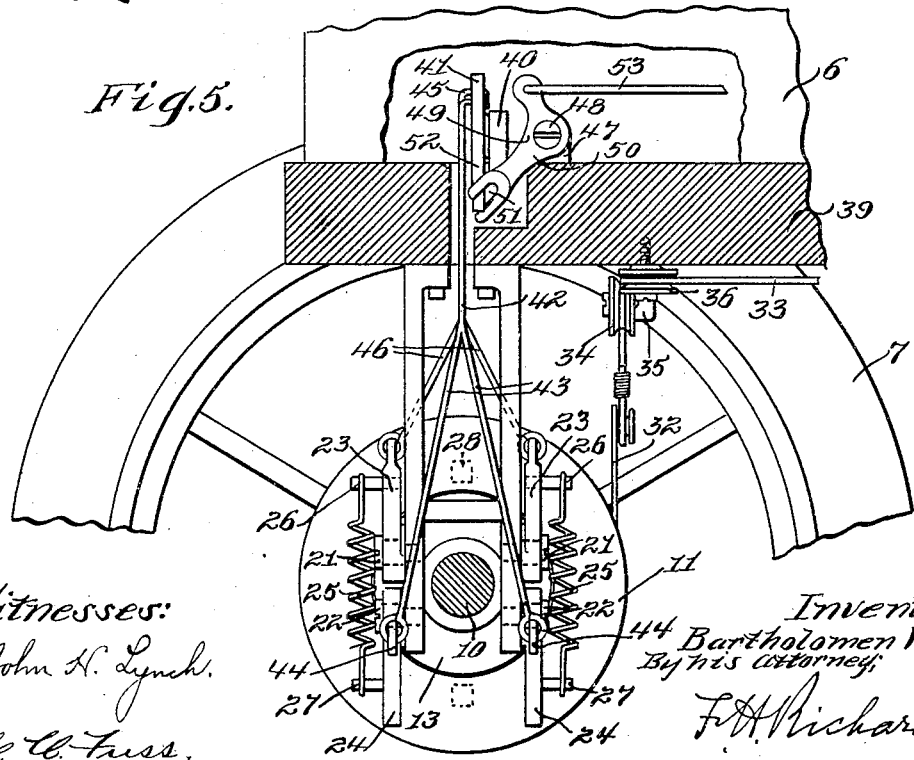
Witnesses:
John H. Lynch.
G. C. Fuss.
Inventor:
Bartholomen Viola.
By his Attorney;
F. H. Richards.

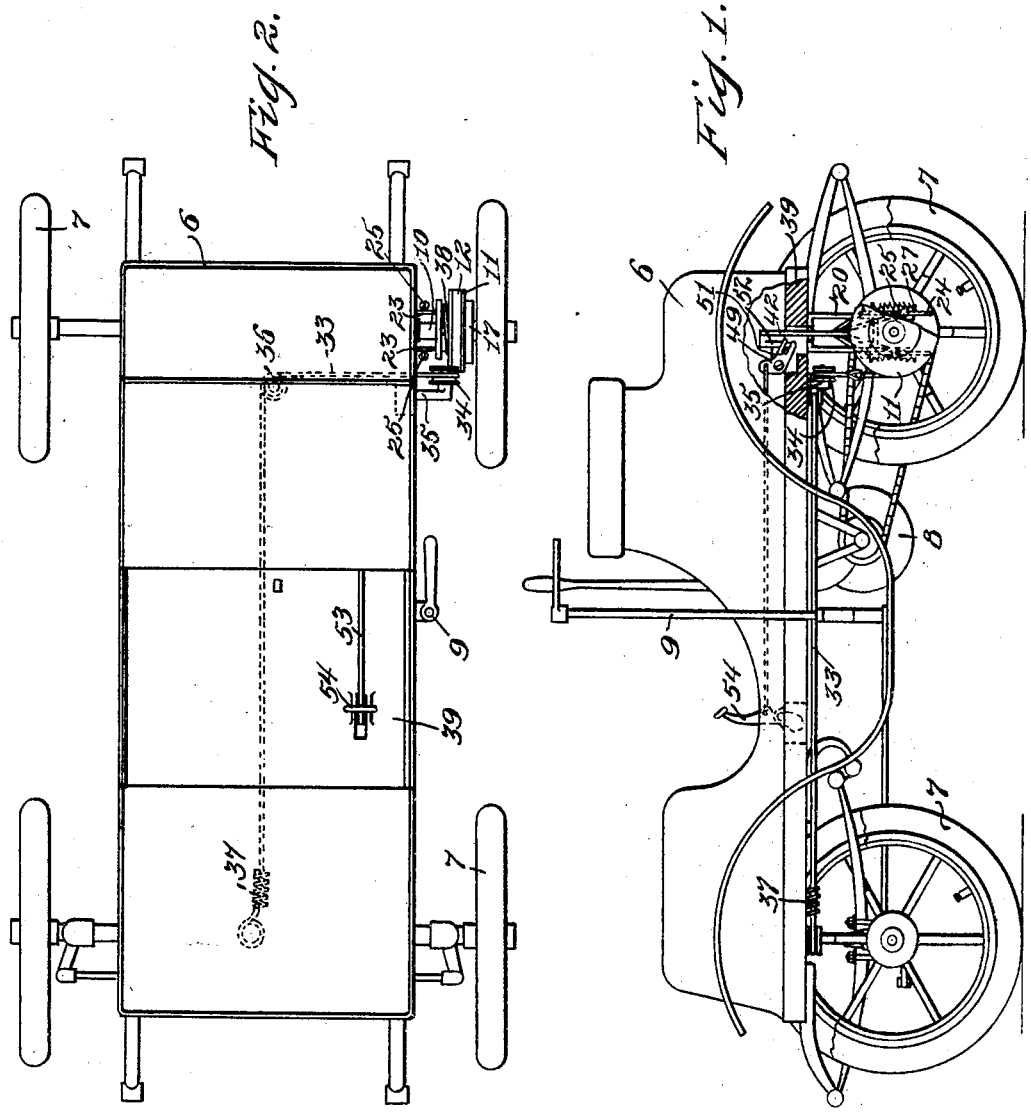

UNITED STATES PATENT OFFICE.

BARTHOLOMEW VIOLA, OF BROOKLYN, NEW YORK.

VEHICLE-BRAKE.

No. 809,341.        Specification of Letters Patent.        Patented Jan. 9, 1906.

Application filed March 20, 1905. Serial No. 250,912.

*To all whom it may concern:*

Be it known that I, BARTHOLOMEW VIOLA, a citizen of the United States, residing in Brooklyn, in the county of Kings and State of New York, have invented certain new and useful Improvements in Vehicle-Brakes, of which the following is a specification.

The invention has reference to brakes, and more particularly to that class which are applicable to vehicles, especially for automobiles.

It is an object of the invention to provide a device which is capable of quick and efficient action, so that the same may be employed as an emergency-brake to stop the vehicle.

It is also an object to provide a device which will be positive and efficient in its action and to simplify an organization by which said objects may be attained.

An embodiment of the invention is illustrated on the accompanying sheets of drawings, whereon—

Figure 1 illustrates a side elevational view of a vehicle, such as an automobile, with an embodiment of the invention thereto applied. Fig. 2 illustrates a top plan view of the same. Fig. 3 illustrates an end elevational view, partly in section, of a brake mechanism in its normal inoperative position, also a fragment of the vehicle. Fig. 4 illustrates a view similar to Fig. 3, with the elements of the brake mechanism in a position relatively different from that illustrated in said Fig. 3, and shows the brake in operation; and Fig. 5 illustrates a side elevational view, partly in section and on an enlarged scale, of such mechanism as is illustrated in conjunction with the rear portion of the running-gear of the vehicle illustrated in Fig. 1.

In the several illustrations similar characters of reference indicate corresponding parts.

While the invention may, as is obvious, be applied to any type of vehicle, the same for convenience of illustration is shown as applied to the running-gear of an automobile, which consists of the usual body 6, wheels 7, driving mechanism 8, and steering device 9.

Upon an axle 10, which may be the rear axle, or the axle to which is transmitted the power for operating the vehicle, may be mounted a member 11, which in the present instance may be provided with peripheral groove 12 and which, if desired, may be supported upon a member 13, which may be suitably mounted upon and secured to the axle 10 by a key 14.

Suitably affixed to a hub 15 of the wheel 7 is a member 16, which may be provided with a laterally-extending flange 17, which takes against and serves as a guide along which a rib 19 of the member 11 may move.

Pivotally mounted upon standards 20 and which may be secured thereto by screws or bolts 21 and 22 are levers 23 and 24, which have a normal tendency by virtue of spring 25, which connects the levers at 26 and 27, to press against the member 11, so as to urge said member in a lateral direction and in a plane parallel to the longitudinal axis of the axle 10, so that the members 28 which are carried by said member 11 may engage with corresponding members or recesses 29 of the member 17, while, as illustrated, the ends of the levers may bear against the member 11. Means may be provided whereby to provide a connection between the levers and member 11, so that said levers on being retracted may withdraw the member 11 from engagement with the member 17. At a suitable point on the member 11—for instance, as at 30—may be secured a band-brake 31, whose free end 32 may be secured to a cable 33 in any suitable manner, and this cable passes over a pulley 34, carried by an arm 35, also over a pulley 36, when it may be carried to some suitable point on the under side of the vehicle where it may be rigidly secured or be connected to a compensating member 37, such as a spring, so that when the band-brake is operated such spring may take up the shock. Thus it will be seen that when the levers 23 and 24 are permitted to yield to the influence of the spring 25 and the member 11 is consequently moved relatively to the member 17, so that the engaging members 28 and 29 may coöperate, the band-brake will then be instantly wound upon the member 11, whereby the wheels 7 will cease to rotate.

For the purpose of normally maintaining the members 11 and 17 relatively distant there may be interposed between the flange 19 and the wall of the member 17 a spring 38, the tension of which is sufficient to keep the parts normally separated, but which will not be of such strength as to overpower the efficiency of the spring 25.

To a suitable portion of the vehicle, such as the floor 39, and to bearings 40 disposed thereon may be movably mounted actuators, which may be in the form of bell-cranks 41, to one set of arms of which may be secured cables 42, which may connect with cables 43, connected to the arms 44 of the levers 24, while another cable 45 may connect said bell-crank with cables 46, leading to the levers 23. Contiguously related to the bearing 40 is another bearing 47, upon which may be pivoted, as at 48, a bell-crank 49, one of whose arms 50 may be bifurcated, as at 51, to receive the arm 52 of said first-mentioned bell-crank, to which may be secured a cable 53, which may lead to a foot-piece 54, the manipulations of which foot-piece may be transmitted, through said second-mentioned bell-crank, to the first-mentioned bell-crank and thence to the levers 23 and 24. Thus it will be observed that the mechanism may be so operated at will that the levers 23 and 24, respectively, and the spring 25 may exert their influence on the member 11, so that the latter may coöperate with the member 17 when the vehicle is in motion, whereupon the band-brake will offer such instant and positive resistance as will cause substantially instantaneous inoperation of the vehicle.

Having thus described this invention, I claim—

1. The combination with a vehicle, of a member on a wheel thereof and having engageable devices thereon, a shaft, a member shiftable relatively to said shaft, and adapted to coöperate with said engageable devices, a band-brake attached to said member to prevent its rotation when the same coöperates with said engageable devices, and levers adapted to effect the relative movement of said member.

2. The combination with a vehicle, of a member on a wheel thereof, and having engageable devices thereon, a shaft, a member shiftable relatively to said shaft and adapted to coöperate with said engageable devices, a band-brake attached to said member to prevent its rotation when the same coöperates with said engageable devices, levers adapted to effect the relative movement of said member, and means to actuate said levers.

3. The combination with a vehicle, of a member having engageable devices thereon, a shaft, a member shiftable relatively to said shaft and adapted to coöperate with said engageable devices, a band-brake attached to said member to prevent its rotation when the same coöperates with said engageable devices, means to effect the relative movement of said member, and means to control said last-mentioned means.

4. The combination with a vehicle, of a member having engageable devices thereon, a shaft, a member shiftable relatively to said shaft and adapted to coöperate with said engageable devices, a band-brake attached to said member to prevent its rotation when the same coöperates with said engageable devices, and levers adapted to press against and effect the relative movement of said member.

5. The combination with a vehicle, of a member having engageable devices thereon, a shaft, a member shiftable relatively to said shaft and adapted to coöperate with said engageable devices, a band-brake attached to said member to prevent its rotation when the same coöperates with said engageable devices, spring-actuated levers adapted to effect the relative movement of said member, means to control said levers, and means to operate said means.

6. The combination with a vehicle, of a member having engageable devices thereon, a shaft, a member, shiftable relatively to said shaft and adapted to coöperate with said engageable devices, a band-brake attached to said member to prevent its rotation when the same coöperates with said engageable devices, spring-actuated means adapted to effect the relative movement of said member, connections to control said means, also means to operate said connection.

7. In a vehicle the combination with a wheel, of a member secured thereto and provided with a clutch portion an axle, a member movable thereupon and parallel to the longitudinal axis thereof and adapted to engage and operate with the first-mentioned member, a band-brake for impeding the rotation of the second member when in engagement with the first member, means to effect such engagement, and a spring to normally maintain such members disengaged.

8. In a vehicle the combination with a wheel, of a member secured thereto and provided with a clutch portion, an axle, a member movable thereupon and parallel to the longitudinal axis thereof and adapted to engage and operate with the first-mentioned member, a band-brake for impeding the rotation of the second member when in engagement with the first member, means to effect such engagement, means to normally maintain such members disengaged, means to operate said first-mentioned means, and a connection between the vehicle and the band-brake.

9. In a vehicle the combination with a wheel, of a member secured thereto and provided with a clutch portion, an axle, a member movable thereupon and parallel to the longitudinal axis thereof and adapted to engage and operate with the first-mentioned member, a band-brake for impeding the rotation of the second member when in engagement with the first member, means to effect such engagement, means to normally maintain such members disengaged, means to operate said first-mentioned means, and a spring connection between the vehicle and the band-brake.

Signed at Nos. 9 to 15 Murray street, in the city, county, and State of New York, this 18th day of March, 1905.

BARTHOLOMEW VIOLA.

Witnesses:
FRED. W. BARNACLO,
JOHN O. SEIFERT.